United States Patent [19]

Young

[11] 4,046,674
[45] Sept. 6, 1977

[54] PROCESS FOR REMOVING ARSENIC FROM HYDROCARBONS

[75] Inventor: Dean Arthur Young, Yorba Linda, Calif.

[73] Assignee: Union Oil Company of California, Los Angeles, Calif.

[21] Appl. No.: 700,017

[22] Filed: June 25, 1976

[51] Int. Cl.$^2$ .............................................. C10G 23/02
[52] U.S. Cl. ............................... 208/251 H; 208/253
[58] Field of Search ............................ 208/251 H, 253

[56] References Cited

U.S. PATENT DOCUMENTS

| | | | |
|---|---|---|---|
| 2,954,339 | 9/1960 | Beavon | 208/251 H |
| 3,712,861 | 1/1973 | Rosinski et al. | 208/251 H |
| 3,804,750 | 4/1974 | Myers et al. | 208/251 H |
| 3,876,533 | 4/1975 | Myers | 208/251 H |
| 3,933,624 | 1/1976 | Myers | 208/253 |

*Primary Examiner*—Delbert E. Gantz
*Assistant Examiner*—James W. Hellwege
*Attorney, Agent, or Firm*—Gregory F. Wirzbicki; Lannas S. Henderson; Richard C. Hartman

[57] ABSTRACT

A process for removing arsenic from a mineral oil feedstock containing at least 2 ppmw arsenic comprises contacting said feedstock at elevated temperatures with a catalytic absorbent comprising a nickel sulfide and a molybdenum sulfide composited with a refractory oxide, said nickel sulfide and said refractory oxide each being present in relatively large proportions. Under preferred conditions a product oil stream containing less than 2 ppmw arsenic is continuously obtained from said contacting until a weight of arsenic at least equivalent to that of the nickel in the catalytic absorbent has been absorbed thereon.

27 Claims, No Drawings

PROCESS FOR REMOVING ARSENIC FROM HYDROCARBONS

BACKGROUND OF THE INVENTION

1. Field of the Invention

This invention relates to an improvement in the demetallization of petroleum feedstocks. In particular, it relates to the removal of arsenic from shale oil and other mineral oils.

2. Prior Related Art encountered when hydrocarbon crudes, such as crude shale oils, which contain more than about 2 ppmw arsenic, must be processed. Arsenic present in such concentrations, particularly when it exceeds 5 or 6 ppmw, quickly deactivates hydrocracking, hydrotreating, and other refining catalysts. Hence, to avoid the premature replacement of expensive catalysts, it is necessary to remove the arsenic from shale oils and the like prior to conventional refining.

One method known for removing arsenic from shale oil is disclosed in U.S. Pat. No. 3,804,750 to Myers et al. It is shown therein that a hydrotreating catalyst comprising nickel sulfide, molybdenum sulfide, and alumina is useful for removing an amount of arsenic equal to no more than about 7.7% of the weight of the catalyst. (By way of comparison, the catalytic absorbents utilized in the process described herein are useful for removing an amount of arsenic at least equal to 23.6% of the weight of said catalytic absorbents.) Another method is shown in U.S. Pat. No. 3,876,533 to Myers. It is disclosed therein that particles comprising oxides and/or sulfides of iron, cobalt, and nickel can be used to adsorb arsenic. As the arsenic is adsorbed, portions of the particles containing the deposited arsenic flake off and are subsequently collected by filtration.

The difficulties with the prior art processes reside in the fact that one is left with a choice of either using a low capacity but costly adsorbent or installing expensive filtration equipment. Accordingly, it is an object of this invention to reduce the concentration of arsenic in shale oil by contacting the shale oil with a high capacity, cohesive catalytic absorbent. Other objectives and advantages will appear to those skilled in the art from the specification including claims herein.

SUMMARY OF THE INVENTION

In accordance with the present invention, Colorado shale oils and other mineral oil feedstocks containing at least 2 ppmw arsenic are contacted at elevated temperatures, and preferably at elevated pressures and in the presence of hydrogen, with a catalytic absorbent comprising between about 30 and 70 wt.% of one or more nickel components and 2 and 20 wt.% of one or more molybdenum components composited with a refractory oxide, said nickel and molybdenum components comprising a nickel sulfide and a molybdenum sulfide. A product oil containing arsenic in a lower concentration than in the feedstock, preferably at least 10% lower, is withdrawn from the contacting until a weight of arsenic at least equivalent to that of the nickel in the catalytic absorbent has been absorbed thereon. When preferred conditions are utilized, a product oil stream containing less than 2 ppmw arsenic is withdrawn from said contacting until a weight of arsenic at least equivalent to that of the nickel in the catalytic absorbent has been absorbed thereon.

Preferred catalytic absorbents for use herein are made by compositing $NiCO_3$ and $(NH_4)_6Mo_7O_{24}$ with alumina and then subjecting the composite to conventional calcining and sulfiding treatments, the latter treatment being preferably accomplished with a gas mixture consisting of carbon disulfide and nitrogen in at least a 1:4, $CS_2:N_2$, mole ratio. The resulting preferred catalytic absorbent should contain at least 40 wt.% of nickel components, at least 5 wt.% of molybdenum components, and at least 35 wt.% of alumina.

It will be understood that, although the term "catalytic absorbent" is used herein to describe the material with which the feedstocks are contacted, and the term "absorbed" is used to describe the mechanism by which the arsenic is held thereon, the invention embraces whatever mechanism, including absorption, adsorption, deposition, chemical reaction, etc., or come combination of such mechanisms, by which the arsenic is removed and retained by said catalytic absorbent. Also, the terms "arsenic" and "arsenic components" are used interchangeably herein and are intended to include arsenic in whatever form, elemental or combined, it may be present. Also, all feedstock and product oil arsenic concentrations are herein calculated as elemental arsenic.

DETAILED DESCRIPTION OF THE INVENTION

Feedstocks contemplated to be treated by the method described herein include broadly all liquid hydrocarbon mixtures, including whole crudes, that contain arsenic components in a total concentration in excess of 2 ppmw, preferably in excess of 20 ppmw. Especially contemplated are synthetic hydrocarbon crudes, or fractions thereof, obtained from oil shale, coal, or tar sands. Arsenic concentrations in these materials vary, for example, in the range of about 20–80 ppmw for shale oils and about 20–1200 ppmw for coal tar distillates.

The removal of arsenic from such feedstocks is herein carried out by contacting them at elevated temperatues with a suitable catalytic absorbent. Catalytic absorbents for use herein comprise a nickel sulfide (e.g., $NiS$, $Ni_3S_2$, and $Ni_3S_4$) and a molybdenum sulfide (e.g., $MoS_2$, $MoS_3$, $Mo_2S_3$, $Mo_2S_5$, and $MoS_4$) composited with a refractory oxide. Other nickel and molybdenum components may also be present in the catalytic absorbent, which absorbent should contain between about 2 and 20 wt.% of molybdenum components (herein calculated as $MoO_3$) and between about 30 and 70 wt.% of nickel components (herein calculated as NiO), preferably between about 5 and 15 wt.% of molybdenum components and between about 40 and 70 wt.% of nickel components. It is also preferred that at least 50 wt.% of the nickel components (as NiO) and 50 wt.% of the molybdenum components (as $MoO_3$) be in one or more forms of nickel sulfide and molybdenum sulfide, respectively.

Numerous refractory oxides may be utilized to support the metal components. Representative of such supports include alumina, silica, silica-alumina, zirconia, silica-zirconia, titania, magnesia, crystalline and amorphous zeolites, etc. However, the preferred support is alumina, which for mechanical strength purposes should comprise at least about 35 wt.%, preferably between about 35 and 50 wt.%, of the catalytic absorbent.

Several methods are known in the art by which the nickel and molybdenum components can be composited with the preferred alumina support. One such method, for example, involves impregnating alumina pellets or extrudates with an aqueous solution or solutions of soluble nickel and molybdenum salts. Co-mulling methods are preferred however. The alumina may be co-mulled, for example, with an aqueous solution of nickel and molybdenum salts until an extrudable paste is formed. Alternatively, alumina may be co-mulled with solid nickel and molybdenum salts, such as $NiCO_3$ and $(NH_4)_6Mo_7O_{24}$, and then moistened with sufficient water to create a paste extrudable through a die. This latter co-mulling method is especially preferred when $NiCO_3$ is utilized as the solid nickel salt; catalytic absorbents made from composites in which $NiCO_3$ has been co-mulled, have, for unknown reasons, been found to be considerably more active than catalytic absorbents made from composites produced exclusively from such other nickel compounds as $NiSO_4$, $NiO$, $Ni(NO_3)_2$, etc.

The impregnation or co-mulling of the nickel and molybdenum salts into or with alumina, or other refractory oxides, is followed by calcination between the temperatures of 500° and 1200° F, preferably between 550° and 850° F. This treatment produces a catalyst containing nickel and molybdenum in one or more of their common oxides.

In order to produce a catalytic absorbent for use herein, it is necessary to convert at least some, preferably at least 50 wt.%, most preferably at least 90 wt.%, of both the nickel and molybdenum oxides on the catalyst to sulfides. This may be accomplished by conventionally sulfiding the catalyst. One method by which sulfiding may be done is in situ, that is, by contacting the catalyst for about one day at the process conditions disclosed in Table I presented hereinafter with feedstocks that contain in excess of 1.0 wt.% sulfur. More practically, it is accomplished by conventional presulfiding, typical commercial conditions for which include passing a sulfiding gas over the calcined catalyst for 12 hours at a temperature between 300° and 1200° F and at a space velocity between about 400 and 600 v/v/hr (actual). A typical sulfiding gas for presulfiding purposes comprises 95 vol.% hydrogen and 5 vol.% hydrogen sulfide. However, the preferred sulfiding gases comprise sulfur vapor or gaseous alkyl or aryl mercaptans (R—S—H), disulfides (R—S—S—R), or thioethers (R—S—R). Presulfiding with such gases markedly increases the activity of the resulting catalytic absorbent in comparison to catalytic absorbents presulfided with other conventional sulfiding gases. Evidently, by sulfiding with these componets, more of the nickel and molybdenum oxides are converted to active sulfides than is possible by sulfiding under comparable conditions with hydrogen sulfide, thiophenes, etc. This production of active sulfides is improved when the sulfiding gas contains essentially no strong reducing components such as $H_2$ or CO. Hence, a preferred sulfiding gas composition consists of carbon disulfide and a carrier gas like nitrogen, preferably in proportions of at least 1:4, $CS_2:N_2$. Other suitable carrier gases include methane, ethane, propane, helium, and argon.

Finished catalytic absorbents should preferably have a surface area of at least 50 m² gm, with the most preferred surface areas being between 150 and 350 m²/gm. The density of the absorbents is preferably in the range of 0.40 to 0.85 g/ml. Methods of making preferred catalytic absorbents having the properties described herein are shown in Examples I and II presented hereinafter.

The arsenic-absorbing capacity of any particular catalytic absorbent prepared by the methods described herein is primarily a function of the amount of nickel in the catalytic absorbent and the proportion of arsenic desired in the product oil stream. The maximum capacity of these catalytic absorbents is believed to be about 2.5 lb. of arsenic per pound of nickel in the absorbent. Normally, however, the capacity is somewhat less than theoretical, not only because not all the nickel in the absorbent is available for reaction with the arsenic, but also because it becomes progressively more difficult to maintain a high capacity when product oils containing very low concentrations of arsenic are required. However, other factors may affect the capacity of a particular absorbent. These include: the nature of the feedstock, the proportion of refractory arsenic components therein, the operating conditions utilized, the nature of the catalytic absorbent (i.e., whether preferred or non-preferred), and the degree of sulfiding of said absorbent. In general, however, when suitable operating conditions as hereinafter described are utilized to treat a feedstock containing in excess of 20 ppmw arsenic, a product oil stream containing arsenic in concentrations less than 5 ppmw, generally less than 2 ppmw, is obtainable until a weight of arsenic at least equivalent to the weight of nickel in the catalytic absorbent has been absorbed thereon. In most cases, product oil streams containing less than 6 ppmw, usually less than 5 ppmw, arsenic are obtainable from such feedstocks until the catalytic absorbent has removed at least 1.5 lb., generally at least 1.8 lb., of arsenic per pound of nickel in the absorbent. In fact, as shown in Example V hereinafter, such product oil streams have been so obtained until a weight of arsenic in excess of 2.3 lb. per pound of nickel in the catalytic absorbent has been absorbed thereon.

It should be noted that the capacities of the catalytic absorbents used herein are extremely high in comparison to those presently available. Since the minimum proportion of nickel components in a catalytic absorbent herein is 30 wt.% (as NiO), the minimum capacity of such catalytic absorbent (assuming it removes an amount of arsenic equivalent to the weight of nickel in said absorbent) is 23.6% of absorbent weight. For a preferred catalytic absorbent containing a minimum of 40 wt.% of nickel components, the minimum capacity for arsenic is 31.4% of absorbent weight. However, the capacities of the catalytic absorbents utilized herein are usually much greater than the minimum. As will be shown in Example V hereinafter, when a product oil stream containing less than 5 ppmw arsenic was desired, a preferred catalytic absorbent containing about 42 wt.% of nickel components removed an amount of arsenic equivalent to more than 75% of the weight of said absorbent before it reached exhaustion.

In the preferred method of operation, the removal of arsenic from the arsenic-containing feedstock is achieved by passing said feedstock upwardly or downwardly through a stationary bed of the catalytic absorbent. Fluidized (or ebullient) beds or batch reactors may also be employed but their use is usually uneconomical. Although not necessary, it is preferred that the contacting be carried out in the presence of an atmosphere consisting essentially of hydrogen, light hydrocarbon gases, hydrogen sulfide, inert gases ($N_2$, Ar, etc.), or some combination thereof, which atmosphere may be provided by simply blending an appropriate gas with the feedstock prior to or during the contacting thereof with the catalytic absorbent. The preferred atmosphere contains at least some hydrogen, primarily because the process is contemplated to be utilized in conjunction with hydrotreating operations, but also because the use of hydrogen provides advantages with respect to the removal of refractory arsenic components as hereinafter explained. Carbon dioxide and carbon monoxide may also be present in the atmosphere, but preferably the proportion of carbon dioxide should not exceed 30 mol.% while that of carbon monoxide should not exceed 10 mol.%. It is most preferred, however, that the atmosphere be free of carbon monoxide; there is some evidence that it deactivates the absorbents used herein.

Under a combination of conditions specified in Table I, a typical Colorado shale oil crude containing 30–60 ppmw arsenic may be contacted with a stationary bed of a preferred catalytic absorbent hereinafter described to produce a product oil stream containing the indicated arsenic concentration until the indicated minimum capacity of the catalytic absorbent has been reached. Normally, however, when a combination of preferred conditions is utilized, such absorbents have a capacity within the indicated average range shown in Table I.

It will be understood that conditions outside of those shown in Table I may also be utilized with varying degrees of success. In general, increasing the hydrogen partial pressure and/or lowering the space velocity will tend to increase the quantity of arsenic absorbed. Also, temperatures in the range of 700°–900° F may be utilized, but coking problems may be incurred with some shale oils; this difficulty, however, is alleviated by using higher hydrogen partial pressures. In addition, conditions outside those shown in Table I may prove suitable if lower catalytic absorbent capacities or higher arsenic concentrations in the product oil can be tolerated.

Although the data in Table I indicate the operative conditions for, and results obtainable from, the treatment of synthetic crude oils extracted from Colorado shales, other feedstocks containing arsenic may also be treated by the methods disclosed herein. For most, the broad operating conditions shown in Table I will suffice to produce the desired product oil streams shown therein. For others, it may be necessary to operate under one or more of the more favorable conditions of Table I, such as high hydrogen partial pressure or low space velocity, in order to achieve the desired result.

TABLE I

| Operative Conditions | Desired Product Oil, Arsenic Concentration PPMW as Arsenic | |
|---|---|---|
| | <2 ppmw | <6 ppmw |
| Temperature Range, ° F | 400 – 700 | 400 – 700 |
| Total Pressure, psig | 25 – 5000 | 0 – 5000 |
| Space Velocity, LHSV | 0.2 – 10 | 0.2 – 20 |
| Min. Absorbent Capacity, lb.As/lb.Ni[1] | 1.0 | 1.4 |
| Preferred Conditions | | |
| Temperature Range, ° F | 450 – 700 | 450 – 700 |
| Total Pressure, psig | 50 – 5000 | 5 – 5000 |
| Preferred H₂ Partial Pressure, psia | 10 – 5000 | 0 – 5000 |
| Gas Blending Rate, ft.³/bbl[2] | 1000 – 5000 | 500 – 5000 |
| Space Velocity, LHSV | 0.5 – 8 | 0.5 – 12 |
| Minimum Absorbent Capacity, lb.As/lb.Ni[1] | 1.2 | 1.5 |
| Average Absorbent Capacity, lb.As/lb.Ni[1] | 1.5 – 2.0 | 1.7 – 2.4 |

[1] lb. of absorbed arsenic (in both elemental and combined forms) per lb. of nickel (in both elemental and combined forms) in the catalytic absorbent.
[2] ft³/bbl = volume of gas blended per barrel of feedstock entering absorption column.

As stated hereinbefore, the contacting of the feedstocks with the catalytic absorbents is preferably done in the presence of hydrogen. The reason for this lies in the nature of the arsenic components in petroleum feedstocks. It has been found that the arsenic components in a given feedstock are of two kinds, herein termed the refractory and non-refractory arsenic components. For purposes herein, non-refractory arsenic components consist of those arsenic components that are removable under a given set of operating conditions in the absence of hydrogen; refractory arsenic components consist of the remaining arsenic components in the feedstock. Generally speaking, refractory arsenic components only comprise a very minor proportion of the total arsenic in a feedstock, but they usually prove to be the most difficult to remove, even in part. However, it has been found, as will be shown in Example III hereinafter, that the use of hydrogen-containing atmospheres, especially those consisting essentially of hydrogen, results in the removal of some of these refractory arsenic components. It is for this reason, therefore, that the use of hydrogen-containing atmospheres is preferred.

One unusual feature of the invention is that product oils of low arsenic concentration are obtainable by use of the process described herein regardless of the concentration of arsenic in the feedstock. It has been found, for example, that product oil streams containing less than 5 ppmw arsenic are obtainable from feedstocks containing between 520 and 811 ppmw arsenic when preferred operating conditions as indicated in Table I are utilized. In fact, as shown in Example V hereinafter, when 520–811 ppmw arsenic-containing feedstocks were treated under preferred conditions, a product oil stream containing less than 3 ppmw arsenic was continuously obtained until the catalytic absorbent had removed more than 2.0 lb. of arsenic for every pound of nickel in said absorbent. It is, therefore, a specific embodiment of the invention to contact a feedstock containing at least 200 ppmw arsenic, preferably at least 500 ppmw arsenic, with a catalytic absorbent described hereinbefore to produce a product oil stream containing less than 2 ppmw, 3 ppmw, or 5 ppmw arsenic, as desired.

Another unusual feature of the invention resides in the discovery that, under similar operating conditions and with the same catalytic absorbent, feedstocks containing at least 1.0 wt.% sulfur are generally dearsenated to lower arsenic levels than those containing arsenic in comparable concentrations but containing sulfur in concentrations less than 1.0 wt.%. However, very few feedstocks obtained from synthetic oils contain the requisite 1.0 wt.% proportion of sulfur. Crude Colorado shale oils, for example, contain only about 0.7 wt.% sulfur. Hence, it is one embodiment of this invention to blend with such feedstocks sufficient of a reactive sulfur component such that said feedstocks contain at least 1.0 wt.% sulfur prior to contacting the catalytic absorbent. Preferred reactive sulfur components include alkyl or aryl mercaptans, thioethers, and disulfides. Also preferred is elemental surfur. Suitable reactive sulfur components include hydrogen sulfide and thiophenes.

In a specific embodiment of the invention, the product gas from shale oil retorting operations is utilized as a source of both reactive sulfur and a hydrogen-containing atmosphere. Typical shale oil retorting methods, shown for example in U.S. Pat. No. 3,361,644, produce product gases containing in excess of about 5 vol.%, usually in excess of 15 vol.%, hydrogen, the remainder being largely methane and carbon dioxide. Such product gases are suitable for providing a hydrogen-containing atmosphere during the contacting of the feedstocks with the catalytic absorbents. Moreover, these product gases usually also contain between about 1 and 5 vol.% $H_2S$, which acts as a reactive sulfur component for feedstocks containing less than 1.0 wt.% sulfur.

The following examples are presented only for purposes of illustrating the invention.

EXAMPLE I

A preferred catalytic absorbent for use in the process of the invention was prepared as follows:

300 gm spray dried boehmite alumina powder (76% $Al_2O_3$) and 25 gm Methocel 90 HG (a Dow trade name for hydroxypropyl-methylcellulose) were mulled together for 2 minutes. Then 31 ml of 15 N $HNO_3$ and 100 ml water were added, and the mulling was continued for 3 more minutes. (The addition of the $HNO_3$ provided 0.21 equivalents of $HNO_3$ per mole of $Al_2O_3$.) 46.3 gm ammonium heptamolybdate was then mixed in 180 ml water and the resulting slurry was added to the mulled mixture; the mulling was then continued for 3 minutes. 300 gm basic nickel carbonate (63.6% NiO) and 36 ml of 15N ammonium hydroxide were then added and the mulling was continued for 5 minutes. 350 ml water were then added followed by mulling for 5 minutes. The resulting paste was passed through a die to form clover leaf shaped extrudates (three leaves) having a leaf diameter of about 0.025 in., an overall cross-sectional width of 0.044 in., and overall lengths between 0.1 and 0.50 in. The extrudates were then dried in a steam atmosphere at 300° F and calcined for 2 hours at 600° F. The resulting catalyst had a surface area of 307 m²/gm, a bulk density of 0.41 gm/ml, a crushing strength of 2.8 lb. per pellet, and a pore volume of 0.81 ml/gm., and contained about 42 wt.% NiO, 8 wt.% $MoO_3$, and 50 wt.% $Al_2O_3$. It was then presulfided by heating to 750° F for 2 hours in a flowing stream of gas composed of $N_2$ and $CS_2$ in a ratio of 4:1, $N_2$:$CS_2$.

EXAMPLE II

Another preferred catalytic absorbent was prepared as follows:

100 gm basic nickel carbonate powder (57.3% NiO) was mixed with 150 ml water and the resulting mixture was steam dried at 285° F. The dried nickel carbonate was granulated so as to pass through a 30-mesh screen. Then, a mixture of 93 gm spray dried boehmite alumina (73% $Al_2O_3$), 4 gm Methocel 90 HG, and 100 ml of 1.5 N $HNO_3$ was mulled for 10 minutes. (This mixture provided 0.22 equivalents of $HNO_3$ per mole $Al_2O_3$.) 13 gm ammonium heptamolybdate was added to the mulled mixture, which was then mulled again for 5 minutes. The granulated nickel carbonate and 60 ml water were then added and the mulling was continued for 5 minutes. The resulting paste was passed through a die to produce the same sized extrudates as those described in Example I. The extrudates were then dried in a steam atmosphere at 300° F, calcined at 500° F for 2 hours, and then calcined again for 2 hours at 800° F. The resulting catalyst had a surface area of 268 m²/gm, a bulk density of 0.82 gm/ml, a crushing strength of 15.1 lb. per pellet, and a pore volume of 0.65 ml/gm, and contained about 42 wt% NiO, 8 wt.% $MoO_3$, and 50 wt.% $Al_2O_3$. It was then presulfided as in Example I to produce a preferred catalytic absorbent.

EXAMPLE III

An experiment was conducted to determine how various process variables affect the arsenic concentration in a product oil stream obtained from the contacting of shale oil feedstocks with a preferred catalytic absorbent. Three Colorado shale oil crudes of compositions and properties varying in the ranges shown in Table II were passed in succession through a reactor containing 19.9 gm of catalytic absorbent prepared in the manner shown in Example I.

TABLE II

| FEEDSTOCK COMPOSITION AND PROPERTIES | |
|---|---|
| Arsenic, ppmw as As | 40 – 41 |
| Sulfur, wt.% | 0.749 – 0.799 |
| Kjel Nitrogen | 1.40 – 1.81 |
| Basic Nitrogen | 0.931 – 1.04 |
| Hydrogen | 11.56 – 11.65 |
| Gravity, ° API | 22.3 – 22.5 |
| ASTM D-189 Carbon Residue, wt.% | 1.7 – 1.9 |
| Viscosity at 100° F, CS | 22.0 – 22.1 |
| ASTM Distillation D-116 Engler | |
| IBP, ° F | 146 – 200 |
| 10% | 383 – 394 |
| 30% | 600 – 632 |
| 50% | 738 – 767 |
| 70% | 861 – 873 |
| 90% | 977 – 984 |
| Max. | 1056 – 1073 |
| % Rec. | 97.4 – 98.2 |

Total run time was 70 days, during which time a product oil stream containing 0.9 – 6.3 ppmw arsenic was obtained. Data obtained as a result of varying operating conditions other than temperature, which was maintained at 650° F, is shown in Table III. Also included in Table III are data obtained from (1) adding to the feedstock being treated during days 68–70 sufficient of a solution of 6 wt.% arsenic trioxide dissolved in glycol ether to increase its total concentration of arsenic to 200 ppmw and (2) varying the amount of hydrogen present during the contacting of the feedstocks with the absorbent.

The accumulation of arsenic on the catalytic absorbent as a function of days on stream is shown in Table IV. It is noted that the capacity data shown therein, and in Examples IV–VI hereinafter, are reported in two ways. The first indicates the amount of absorbed arsenic (in both elemental and combined forms) as a percentage of the fresh absorbent weight. The second, expressed as lb.As/lb.Ni, refers to the weight, in pounds, of absorbed arsenic (in both elemental and combined forms) per pound of nickel (in both elemental and combined forms) in the absorbent. (Thus, if a catalytic absorbent weighing 10 pounds and containing 42 wt.% of nickel components (as NiO) is known to have absorbed 10 pounds of $As_2O_3$, then the amount of absorbed arsenic is 75% of absorbent weight or 2.28 lb.As/lb. Ni.) Both of these reporting methods conform with the ways in which capacity of the catalytic absorbents has been expressed hereinbefore in the specification.

TABLE III

| | EFFECTS OF OPERATING VARIABLES ON ARSENIC ABSORPTION | | | | | | |
|---|---|---|---|---|---|---|---|
| Days on Stream | As Conc. in Feed, ppmw as Arsenic | Gas Composition Mol % (dry basis)[1] | Gas Feed Rate ft³/bbl | Total Pressure, psig | Space Velocity LHSV | Product As Conc., ppmw as Arsenic Average | Min./Max. Product As Conc., ppmw as Arsenic[2] |
| 0–5.0 | 40 | SRG[3] | 2000 | 50 | 4.2 | 1.8 | 1.3 / 2.3 |

TABLE III-continued
EFFECTS OF OPERATING VARIABLES ON ARSENIC ABSORPTION

| Days on Stream | As Conc. in Feed, ppmw as Arsenic | Gas Composition Mol % (dry basis)[1] | Gas Feed Rate ft³/bbl | Total Pressure, psig | Space Velocity LHSV | Product As Conc., ppmw as Arsenic, Average | Min./Max. Product As Conc., ppmw as Arsenic[2] |
|---|---|---|---|---|---|---|---|
| 5.0–11.7 | 40 | SRG | 1000 | 50 | 4.2 | 2.1 | 1.7 / 2.6 |
| 11.7–19.7 | 41 | SRG | 1000 | 50 | 6.3 | 3.5 | 2.1 / 4.9 |
| 19.7–33.0 | 41 | SRG | 1000 | 50 | 3.2 | 3.8 | 3.1 / 4.6 |
| 33.0–42.7 | 41 | SRG | 1000 | 200 | 3.2 | 2.5 | 1.7 / 2.8 |
| 42.7–55.0 | 41 | 99$H_2$-1$H_2S$ | 1000 | 200 | 3.2 | 1.9 | 0.9 / 2.9 |
| 55.0–60.7 | 41 | 99$N_2$-1$H_2S$ | 1000 | 200 | 3.2 | 5.3 | 4.8 / 6.3 |
| 60.7–67.3 | 41 | 99$H_2$-1$H_2S$ | 1000 | 50 | 3.2 | 3.8 | 3.2 / 4.2 |
| 67.3–70.3 | 200 | 99$H_2$-1$H_2S$ | 1000 | 50 | 3.2 | 4.9 | 4.1 / 5.4 |

[1]Sufficient water was added to reactor to provide 7.0 mol % $H_2O$ vapor
[2]Based on three samples taken daily
[3]SRG, simulated oil shale retort gas, was of following dry mol % composition: 28 $H_2$, 50 $CH_4$, 2$H_2S$, 7 CO, 13 $CO_2$

TABLE IV
ASSUMULATED ARSENIC ON ABSORBENT VS. TIME ON STREAM

| Days on Stream | Wt. % Arsenic On Absorbent[2] | lb. As/lb. Ni[2] |
|---|---|---|
| 0[1] | 7.1 | .22 |
| 5.0 | 10.7 | .32 |
| 11.7 | 15.7 | .48 |
| 19.7 | 24.6 | .75 |
| 33.0 | 32.0 | .97 |
| 42.7 | 37.6 | 1.14 |
| 55.0 | 44.7 | 1.35 |
| 60.7 | 47.7 | 1.45 |
| 67.3 | 51.5 | 1.56 |
| 70.3 | 60.2 | 1.82 |

[1]At start of run the absorbent contained 7.1 wt.% of absorbed arsenic from previous experiments.
[2]Arsenic absorbtion data in all Examples herein indicate amount of arsenic (in both elemental and combined forms) on absorbent as determined by mass balance calculations based on the concentrations of arsenic in feedstock and product streams.

The results of the experiment indicate that the most important variable was the composition of the gas stream blended with the feedstocks. As shown in Table III, changing the gas stream composition from 99% $H_2$ to 99% $N_2$ resulted in an increase in product oil arsenic concentration from about 1.9 ppmw to about 5.3 ppmw. This indicates that, under any given set of operating conditions, a certain proportion of the arsenic components in a feedstock (i.e., refractory arsenic components) requires the presence of hydrogen for its partial removal.

The most remarkable result of the experiment was that even when the arsenic concentration of the feedstock was increased to 200 ppmw a product oil stream containing less than 6 ppmw arsenic was still produced. Another remarkable result was that the catalytic absorbent removed 60.2% of its original weight in arsenic (i.e., 1.82 lb. arsenic per pound of nickel in the absorbent) and its capacity with respect to the production of a product oil containing less than 6 ppmw arsenic was still not exceeded. Lastly, it is worthy of note that these results were obtained under relatively low pressure conditions; it is expected that under high pressure conditions even more favorable results would be obtainable, at least with respect to arsenic concentrations in the product oil stream.

EXAMPLE IV

In order to determine the capacity of a preferred catalytic absorbent, four Colorado shale oil crudes containing 50, 41, 39, and 40 ppmw arsenic, but otherwise having properties and compositions similar to the feedstocks of Example III, were passed in succession through a reactor containing 19.8 gm of catalytic absorbent prepared in the manner described in Example I. Total run time was 88 days, during the first 77 of which a product oil stream that contained arsenic in concentrations in the range of 0.1–6.2 ppmw was continuously obtained. Throughout the run a constant space velocity of 4.2 LHSV and a constant gas blending rate with the feedstocks of 2000 ft³/bbl were utilized. Data obtained as a result of varying other operating conditions are shown in Table V. Catalytic absorbent capacity as a function of days on stream is shown in Table VI. From the data shown in both Table V and VI, it was determined that a product oil stream containing less then 5 ppmw arsenic could be obtained until the absorbent had removed 2.17 lb. of arsenic per pound of nickel in the absorbent.

TABLE V
Effects of Operating Variables On Arsenic Absorption

| Days On Stream | As Conc. in Feed, ppmw as Arsenic | Gas Composition Mol % | Temp., °F | Total Pressure psig | Product As Conc., ppmw as Arsenic Average | Min./Max. Product As Conc., ppmw as Arsenic[2] |
|---|---|---|---|---|---|---|
| 0–6.6 | 50 | $H_2$ | 650 | 1800 | 0.4 | 0.1/0.8 |
| 6.6–14.9 | 41 | $H_2$ | 650 | 1800 | 0.6 | 0.4/1.0 |
| 14.9–21.6 | 41 | $H_2$ | 650 | 500 | 1.2 | 0.8/1.3 |
| 21.6–27.9 | 41 | $H_2$ | 550 | 500 | 2.8 | 2.3/3.5 |
| 27.9–33.9 | 41 | $H_2$ | 650 | 200 | 1.2 | 0.6/1.5 |
| 33.9–36.9 | 41 | $H_2$ | 650 | 100 | 1.8 | 1.1/1.7 |
| 36.9–39.6 | 39 | $H_2$ | 650 | 100 | 2.5 | 1.4/3.0 |
| 39.6–59.6 | 39 | $H_2$ | 650 | 50 | 2.7 | 1.4/3.4 |
| 59.6–66.5 | 39 | SRG[1] | 650 | 250 | 2.4 | 1.7/3.3 |
| 66.5–68.5 | 39 | SRG | 650 | 100 | 5.1[3] | 4.2/6.2 |
| 68.5–73.0 | 39 | $H_2$ | 650 | 1800 | 3.7 | 3.1/4.2 |
| 73.0–75.3 | 40 | $H_2$ | 650 | 1800 | 3.9 | 3.6/4.1 |
| 75.3–79.0 | 40 | $H_2$ | 650 | 25 | 4.9 | 3.6/6.4 |
| 79.0–81.0 | 40 | $H_2$ | 650 | 25 | 6.9 | 5.0/7.4 |
| 81.0–85.0 | 40 | $H_2$ | 650 | 25 | 13.9 | 11.1/19 |

TABLE V-continued

Effects of Operating Variables On Arsenic Absorption

| Days On Stream | As Conc. in Feed, ppmw as Arsenic | Gas Composition Mol % | Temp., °F | Total Pressure psig | Product As Conc., ppmw as Arsenic Average | Min./Max. Product As Conc., ppmw as Arsenic[2] |
|---|---|---|---|---|---|---|
| 85.0–88.3 | 40 | $H_2$ | 650 | 25 | 21.5 | 19/24 |

[1]SRG, simulated shale oil retort gas, was of following mol % composition: 26.5 $H_2$, 46.7 $CH_4$, 2.1 $H_2S$, 6.6 $H_2O$, 6.5 CO, and 11.7 $CO_2$
[2]Based on three samples taken daily
[3]The only time during the first 77 days that the daily average arsenic concentration in the product oil exceeded 5.0 ppmw was on the 67th day. This is attributable to the use of SRG gas, the decrease in operating pressure that day, and the fact that the absorbent was approaching exhaustion.

TABLE VI

Accumulated Arsenic on Absorbent vs Time on Stream

| Days on Stream | Wt. % Arsenic on Absorbent | lb. As/lb. Ni |
|---|---|---|
| 0[1] | 3.8 | 0.12 |
| 6.6 | 11.5 | 0.35 |
| 11.3 | 15.9 | 0.48 |
| 14.9 | 19.3 | 0.59 |
| 21.6 | 25.6 | 0.78 |
| 27.9 | 31.2 | 0.95 |
| 33.9 | 36.8 | 1.12 |
| 36.9 | 39.5 | 1.20 |
| 39.6 | 41.8 | 1.27 |
| 59.6 | 58.6 | 1.78 |
| 66.5 | 64.5 | 1.95 |
| 68.5 | 66.0 | 2.00 |
| 73.0 | 69.7 | 2.11 |
| 75.3 | 71.7 | 2.17 |
| 79.0 | 74.6 | 2.26 |
| 81.0 | 76.2 | 2.31 |
| 85.0 | 78.6 | 2.38 |
| 88.3 | 80.0 | 2.42 |

[1]At the start of the test, the absorbent contained 3.8 wt.% arsenic from a previous experiment.

EXAMPLE V

In order to determine the capacity of a preferred catalytic absorbent prepared as described in Example II, a Colorado crude shale oil having properties and a composition similar to the feedstocks of Example III was passed through a 41.0 gm bed of said absorbent at a temperature of 650° F, a 200 psig total pressure, a space velocity of 4.2 LHSV, and in the presence of a gas comprising 99 mol.% $H_2$ and 1 mol.% $H_2S$, which gas was blended with the feedstock at a rate of 1000 ft³/bbl. The feedstock was also blended with sufficient of a solution of 6 wt.% arsenic trioxide dissolved in glycol ether so that the resulting mixture contained the concentration of arsenic shown in Table VII for the indicated time period. Total run time was 12 days, but as shown in Table VII the exhaustion point for the absorbent occurred during the time period of 9.3–11.0 days on stream. The capacity of the absorbent was therefore determined to be 2.34 lb. of arsenic per pound of nickel in the absorbent when a product oil stream containing less than 5 ppmw of arsenic is desired, and 2.81 lb. of arsenic per pound of nickel when a 6 ppmw arsenic product stream is desired.

An interesting result from this experiment was that a product oil stream containing a desired concentration of arsenic was obtained regardless of the concentration of arsenic in the feedstock. As shown in Table VII, even when sufficient of an arsenic component was added to the feedstock to increase the total arsenic concentration to 520–811 ppmw arsenic, a product oil stream containing arsenic in concentrations in the range 0.4–2.9 ppmw was obtained. Moreover, the results obtained with the feedstocks that contained 731 or 811 ppmw arsenic were similar to those containing 520 ppmw arsenic, thereby demonstrating the independence of the degree of arsenic removal with respect to arsenic concentration in the feedstock.

It should also be noted that the capacities of the absorbent used in this Example and in that of Example IV are comparable. However, since the crushing strength of a pellet of absorbent used herein was found to be 7.3 pounds at the end of the experiment, while that of Example IV was less than 1.0 pound, the use of the higher strength absorbent is preferred for commercial purposes.

TABLE VII

| | Time on Stream, Days | | | | |
|---|---|---|---|---|---|
| | 0–3 | 3–4.6 | 4.6–9.3 | 9.3–11 | 11–12 |
| Arsenic in Feed, ppmw as Arsenic | 731 | 520 | 811 | 811 | 811 |
| Average Arsenic in Product, ppmw as Arsenic | 0.9 | 1.6 | 1.8 | 4.1 | 6.7 |
| Min./Max. Arsenic in Product, ppmw as Arsenic[1] | 0.4/1.2 | 1.1/1.8 | 1.4/2.9 | 3.2/5.5 | 6.1/7.1 |
| Accumulated Arsenic at end of day period, wt.% Arsenic | 24.8 | 34.1 | 77.1 | 92.6 | 101.7 |
| Accumulated Arsenic at end of day period, lb. As/lb. Ni | 0.75 | 1.03 | 2.34 | 2.81 | 3.08 |

[1]Based on three samples taken daily

EXAMPLE VI

Forty-one gm of catalytic absorbent was prepared as described in Example II except that it was presulfided at 600° F, 200 psig, and a space velocity of 1400 v/v/hr for 8 hours with a gas of the following mol.% composition: 3.6 $CS_2$, 2.2 $H_2S$, 27.1 $H_2$, 48.2 $CH_4$, 6.7 CO, and 12.1 $CO_2$. The absorbent was then contacted at a temperature of 650° F, a pressure of 200 psig, and a space velocity of 4.2 LHSV with a Colorado crude shale oil containing 48 ppmw arsenic. The contacting was carried out over a 16.4 day period, during which time a gas stream of varying composition as shown in Table VIII was blended with the feedstock at a rate of 1000 ft³/bbl. The feedstock was also blended with sufficient of a solution of 6 wt.% arsenic trioxide dissolved in glycol ether such that the feedstock contacting the catalytic absorbent during the first 4.1 days of the run contained 720 ppmw arsenic. The results of the run in terms of arsenic concentration in the product stream during, and the total amount of arsenic absorbed at the end of, various time periods is shown in Table VIII. It is noted that the product oil composition did not exceed 2.0 ppmw and 5.0 ppmw arsenic until 7.2 and 16.0 days, respectively, had elapsed. This corresponds to an absorbent capacity of 1.06 and 1.19 lb.AS/lb.Ni, respectively.

TABLE VIII

| Days On Stream | As Conc. in Feed, ppmw as As | Gas Composition in mol.%[1] | | | | Arsenic In Product ppmw as As | Accumulated Arsenic Day Period | |
|---|---|---|---|---|---|---|---|---|
| | | $H_2$ | $H_2S$ | CO | $CO_2$ | | wt.% As | lb. As/ lb. Ni |
| 0–4.1 | 720 | 99 | 1 | 0 | 0 | 1.0 | 33.5 | 1.01 |
| 4.1–5.8 | 48 | 99 | 1 | 0 | 0 | 0.8 | 34.3 | 1.04 |
| 5.8–10.8 | 48 | 28 | 2 | 7 | 13 | 1.8 | 36.9 | 1.12 |
| 10.8–19.8 | 48 | 5 | 3 | 9 | 17 | 4.2 | 41.2 | 1.25 |
| 19.8–25.8 | 48 | 50 | 2 | 5 | 9 | 3.4 | 44.2 | 1.34 |

[1]Balance of compositions, if any, is methane

The results of this experiment indicate that the use of simulated oil shale retort gases produces results inferior to those obtained when a gas stream of 99% $H_2$ is utilized. Moreover, it appears that as the proportion of hydrogen present in the retort off gas decreases, the proportion of arsenic in the product oil stream increases. This indicates that the proportion of refractory arsenic components removable by the absorbent progressively increases as the proportion of hydrogen present in the gas stream increases.

EXAMPLE VII

In order to demonstrate that the process of the invention is operative at atmospheric pressure, the following experiment was conducted. 4.12 gm of catalytic absorbent prepared as described in Example I was placed in a micro-reactor through which was passed a crude shale oil containing 48 ppmw arsenic but otherwise having properties and a composition similar to the feedstocks of Example III. The contacting was carried out at atmospheric pressure under the varying conditions shown in Table IX and for the time period indicated therein. Hydrogen was used as the gas blended with the feedstock.

As shown in Table IX, the arsenic concentration of the product oil generally increased with increasing space velocity. Also, a dramatic increase in the arsenic concentration of the product oil to unacceptable levels occurred when the feedstock was blended with sufficient of a solution of 6 wt.% arsenic trioxide dissolved in glycol ether to increase the arsenic concentration thereof to 720 ppmw. Although this at first seems to contradict the data shown in Example V, it is more probable that a relatively long residence time is necessary to lower the arsenic concentration to less than 5 ppmw when the arsenic concentration of the feedstock is in excess of 100 ppmw. Hence, it is believed that the high space velocities of 8.6 - 10.0 LHSV simply did not provide an adequate residence time to produce an acceptable product oil stream.

TABLE IX

| Hours on Stream | Temp. °F | LH-SV | Gas Stream, ft³/bbl | Conc. of Arsenic in Feed, ppmw as Arsenic | Conc. of Arsenic in Product, ppmw as Arsenic[1] |
|---|---|---|---|---|---|
| 0–4.4 | 550 | 4.0 | 420 | 48 | 2.1 |
| 4.4–5.8 | 650 | 6.0 | 280 | 48 | 1.5 |
| 5.8–7.8 | 650 | 5.5 | 310 | 48 | 1.9 |
| 7.8–11.7 | 655 | 10.5 | 160 | 48 | 2.8 |
| 11.7–14.7 | 650 | 12.1 | 140 | 48 | 3.4 |
| 14.7–16.8 | 650 | 8.1 | 210 | 48 | 3.0 |
| 16.8–19.0 | 652 | 10.0 | 170 | 720 | 8.3 |
| 19.0–23.1 | 650 | 8.6 | 200 | 720 | 11.0 |
| 23.1–25.6 | 648 | 9.5 | 180 | 720 | 8.9 |
| 25.6–29.0 | 648 | 10.5 | 160 | 48 | 5.7 |

TABLE IX-continued

| Hours on Stream | Temp. °F | LH-SV | Gas Stream, ft³/bbl | Conc. of Arsenic in Feed, ppmw as Arsenic | Conc. of Arsenic in Product, ppmw as Arsenic[1] |
|---|---|---|---|---|---|
| 29.0–32.0 | 648 | 4.9 | 350 | 48 | 3.2 |

[1]Based on one sample obtained near the end of each of the indicated time periods.

Although the invention has been described in conjunction with specific embodiments thereof, it is evident that many alternatives and variations will be apparent to those skilled in the art in light of the foregoing description. Accordingly, it is intended to embrace all such alternatives and variations that fall within the spirit and scope of the appended claims.

I claim:
1. A process comprising:
   a. contacting a hydrocarbon feedstock containing at least 2 ppmw arsenic at elevated temperatures with a catalytic absorbent comprising between about 30 and 70 wt.% of one or more nickel components (as NiO) and 2 and 20 wt.% of one or more molybdenum components (as $MoO_3$) composited with a refractory oxide, said nickel and molybdenum components comprising a nickel sulfide and a molybdenum sulfide, until a weight of arsenic at least equal to the weight of nickel in the catalytic absorbent has been absorbed thereon; and
   b. withdrawing from said contacting a product oil stream containing arsenic in a lower concentration than said feedstock.

2. A process as defined in claim 1 wherein said product oil stream contains less than 2 ppmw arsenic.

3. A process as defined in claim 2 wherein said catalytic absorbent comprises at least 40 wt.% of nickel components, at least 5 wt.% of molybdenum components, and at least 35 wt.% of alumina.

4. A process as defined in claim 3 wherein said contacting is accomplished in the presence of hydrogen.

5. A process as defined in claim 3 wherein said feedstock is a synthetic crude or fraction thereof obtained from oil shale, tar sands, or coal.

6. A process as defined in claim 5 wherein said contacting is accomplished at elevated pressures and in the presence of hydrogen.

7. A process comprising:
   a. contacting a hydrocarbon feedstock containing at least 20 ppmw arsenic at elevated temperatures with a catalytic absorsent comprising between about 30 and 70 wt.% of one or more nickel components (as NiO) and 2 and 20 wt.% of one or more molybdenum components (as $MoO_3$) composited with a refractory oxide, said nickel and molybdenum components comprising a nickel sulfide and a molybdenum sulfide, until a weight of arsenic at least equivalent to the weight of nickel in the catalytic absorbent has been absorbed thereon; and b. withdrawing from said contacting a product oil stream containing less than 6 ppmw arsenic.

8. A process as defined in claim 7 wherein said product oil stream is withdrawn until the catalytic absorbent has removed at least 1.5 lb. of arsenic per pound of nickel in said catalytic absorbent.

9. A process as defined in claim 7 wherein said product oil stream contains less than 2 ppmw arsenic.

10. A process as defined in claim 7 wherein said product oil stream contains less than 5 ppmw arsenic.

11. A process as defined in claim 10 wherein said product oil stream is withdrawn until the catalytic absorbent has removed at least 1.5 lb. of arsenic per pound of nickel in said absorbent.

12. A process as defined in claim 11 wherein said feedstock contains at least 1.0 wt.% sulfur.

13. A process as defined in claim 11 wherein said contacting is accomplished at elevated temperatures and in the presence of hydrogen and wherein said feedstock is a synthetic crude or fraction thereof obtained from oil shale, tar sands, or coal.

14. A process as defined in claim 13 wherein said feedstock is a synthetic crude or fraction thereof obtained from a Colorado oil shale.

15. A process as defined in claim 13 wherein said catalytic absorbent comprises between 40 and 70 wt.% of nickel components and between about 5 and 15 wt.% of molybdenum components.

16. A process as defined in claim 13 wherein said catalytic absorbent comprises at least 40 wt.% of nickel components, at least 5 wt.% of molybdenum components, and at least 35 wt.% of alumina.

17. A process as defined in claim 16 wherein said catalytic absorbent was prepared by compositing nickel carbonate and a molybdenum salt with alumina, followed by calcining and sulfiding of the resulting composite, said sulfiding being accomplished by presulfiding with a gas comprising sulfur vapor, or alkyl or aryl mercaptans, disulfides, or thioethers.

18. A process as defined in claim 11 wherein said feedstock originally contained less than 1.0 wt.% sulfur and sufficient of a reactive sulfur component is blended therewith to provide a total of at least 1.0 wt.% sulfur prior to contacting the catalytic absorbent.

19. A process as defined in claim 18 wherein said feedstock is a synthetic crude or fraction thereof obtained from a Colorado oil shale.

20. A process as defined in claim 11 wherein said product oil contains less than 3 ppmw arsenic.

21. A process as defined in claim 20 wherein said contacting is accomplished at elevated pressures and in the presence of hydrogen.

22. A process comprising:

a. contacting a hydrocarbon feedstock containing at least 2 ppmw arsenic at elevated temperatures with a catalytic absorbent comprising between about 30 and 70 wt.% of one or more nickel components (as NiO) and 2 and 20 wt.% of one or more molydenum components (as $MoO_3$) composited with a refractory oxide, said nickel and molybdenum components comprising a nickel sulfide and a molybdenum sulfide, said contacting being carried out in the presence of an atmosphere consisting essentially of one or more components selected from the class consisting of inert gases, light hydrocarbon gases, and carbon dioxide; and b. withdrawing from said contacting a product oil stream containing arsenic in a lower concentration than said feedstock.

23. A process as defined in claim 22 wherein said contacting is carried out until a weight of arsenic at least equivalent to the weight of nickel in the catalytic absorbent has been absorbed thereon.

24. A process comprising:

a. contacting a hydrocarbon feedstock containing at least 200 ppmw arsenic at elevated temperatures with a catalytic absorbent comprising between about 30 and 70 wt.% of one or more nickel components (as NiO) and 2 and 20 wt.% of one or more molybdenum components (as $MoO_3$) composited with a refractory oxide, said nickel and molybdenum components comprising a nickel sulfide and a molybdenum sulfide; and b. withdrawing from said contacting a product oil stream containing less than 5 ppmw arsenic.

25. A process as defined in claim 24 wherein said feedstock is a coal tar distillate.

26. A process as defined in claim 24 wherein said feedstock is a coal tar distillate containing at least 500 ppmw arsenic.

27. A process as defined in claim 26 wherein said product oil stream contains less than 2 ppmw arsenic.

* * * * *